United States Patent
Makharia et al.

(10) Patent No.: US 9,974,109 B2
(45) Date of Patent: May 15, 2018

(54) NON-INTRA-FREQUENCY (NIF) CELL RESELECTION AND MEASUREMENT IN WIRELESS COMMUNICATIONS

(71) Applicant: Apple Inc., Cupertino, CA (US)

(72) Inventors: Shivesh Makharia, San Jose, CA (US); Sree Ram Kodali, Sunnyvale, CA (US); Longda Xing, San Jose, CA (US); Jianxiong Shi, Dublin, CA (US)

(73) Assignee: Apple Inc., Cupertino, CA (US)

( * ) Notice: Subject to any disclaimer, the term of this patent is extended or adjusted under 35 U.S.C. 154(b) by 190 days.

(21) Appl. No.: 14/171,611

(22) Filed: Feb. 3, 2014

(65) Prior Publication Data

US 2014/0220975 A1 Aug. 7, 2014

Related U.S. Application Data

(60) Provisional application No. 61/760,540, filed on Feb. 4, 2013.

(51) Int. Cl.
*H04W 36/00* (2009.01)
*H04W 76/04* (2009.01)
*H04W 48/20* (2009.01)

(52) U.S. Cl.
CPC ......... *H04W 76/048* (2013.01); *H04W 48/20* (2013.01)

(58) Field of Classification Search
CPC .......... H04W 76/048; H04W 36/0066; H04W 36/0083; H04W 36/30; H04W 36/24
USPC ......... 455/436–438, 525, 440, 442, 443, 62, 455/161.1
See application file for complete search history.

(56) References Cited

U.S. PATENT DOCUMENTS

| | | |
|---|---|---|
| 2010/0240368 A1 | 9/2010 | Fox |
| 2010/0330992 A1 | 12/2010 | Bhattacharjee |
| 2011/0110251 A1 | 5/2011 | Krishnamurthy et al. |
| 2011/0244868 A1* | 10/2011 | Senarath ............... H04W 36/18 455/442 |
| 2013/0065594 A1 | 3/2013 | Somasundaram et al. |
| 2013/0258883 A1* | 10/2013 | Vargas Bautista ......................... H04W 36/0094 370/252 |
| 2014/0128083 A1* | 5/2014 | Esch ..................... H04W 36/26 455/439 |

FOREIGN PATENT DOCUMENTS

WO 2013028119 A1 2/2013

\* cited by examiner

*Primary Examiner* — Ankur Jain
*Assistant Examiner* — Said Elnoubi
(74) *Attorney, Agent, or Firm* — Meyertons, Hood, Kivlin, Kowert & Goetzel, P.C.

(57) ABSTRACT

A wireless communication system is presented in which user equipment (UE) performs non-intra-frequency (NIF) cell reselection. The NIF cell reselection process can: detect, on a discontinues reception (DRX) cycle, whether a NIF for a second cell has passed a second reselection threshold; perform, on the DRX cycle, additional checks or measurements to determine whether a higher priority NIF for a third cell has passed a third reselection threshold; and continue a cell reselection process for the second cell and the third cell. The NIF cell reselection techniques can help ensure that the UE reselects to higher priority cells without expending an unnecessary amount power.

17 Claims, 8 Drawing Sheets

NON-INTRA-FREQUENCY (NIF) CELL RESELECTION AND MEASUREMENT IN WIRELESS COMMUNICATIONS

BACKGROUND

Field of the Application

The disclosure is directed to wireless communications and, more particularly, to non-intra-frequency (NIF) cell reselection and measurement in wireless communications.

Background of the Disclosure

Wireless communication systems are widely deployed to provide various communication services, such as: voice, video, packet data, circuit-switched info, broadcast, messaging services, and so on. A typical wireless communication system, or network, can provide multiple users access to one or more shared resources (e.g., bandwidth, transmit power, etc.). These systems can be multiple-access systems that are capable of supporting communication for multiple terminals by sharing available system resources. Examples of such multiple-access systems include Code Division Multiple Access (CDMA) systems, Time Division Multiple Access (TDMA) systems, Frequency Division Multiple Access (FDMA) systems and Orthogonal Frequency Division Multiple Access (OFDMA) systems.

Generally, a wireless multiple-access communication system can simultaneously support communication for multiple wireless devices or terminals. In such a system, each terminal can communicate with one or more base stations via transmissions on the forward and reverse links. The forward link (or downlink) refers to the communication link from the base stations to the terminals, and the reverse link (or uplink) refers to the communication link from the terminals to the base stations. This communication link can be established via a single-in-single-out (SISO), single-in-multiple-out (SIMO), multiple-in-signal-out (MISO), or a multiple-in-multiple-out (MIMO) system.

For instance, a MIMO system can employ multiple ($N_T$) transmit antennas and multiple ($N_R$) receive antennas for data transmission. A MIMO channel formed by the $N_T$ transmit and $N_R$ receive antennas can be decomposed into $N_S$ independent channels, which are also referred to as spatial channels, where $N_S \leq \min \{N_T, N_R\}$. Each of the $N_S$ independent channels can correspond to a dimension. The MIMO system can provide improved performance (e.g., higher throughput and/or greater reliability) if the additional dimensionalities created by the multiple transmit and receive antennas are utilized.

A MIMO system can support time division duplex (TDD) and/or frequency division duplex (FDD) systems. In an FDD system, the transmitting and receiving channels are separated with a guard band (some amount of spectrum that acts as a buffer or insulator), which allows two-way data transmission by, in effect, opening two distinct radio links. In a TDD system, only one channel is used for transmitting and receiving, separating them by different time slots. No guard band is used. This can increase spectral efficiency by eliminating the buffer band and can also increase flexibility in asynchronous applications. For example, if less traffic travels in the uplink, the time slice for that direction can be reduced, and reallocated to downlink traffic.

Wireless communication systems oftentimes employ one or more base stations that provide a coverage area. A typical base station can transmit multiple data streams for broadcast, multicast and/or unicast services, wherein a data stream may be a stream of data that can be of independent reception interest to a mobile device. A mobile device within the coverage area of such base station can be employed to receive one, more than one, or all the data streams carried by the composite stream. Likewise, a mobile device can transmit data to the base station or another mobile device.

DETAILED DESCRIPTION

The following detailed description is directed to certain sample embodiments. However, the disclosure can be embodied in a multitude of different ways as defined and covered by the claims. In this description, reference is made to the drawings wherein like parts are designated with like numerals within this application.

This disclosure makes reference to various wireless communication devices, such as access point, mobile device, base station, user equipment, Node B, access terminal and eNB. The use of these and other names is not intended to indicate or mandate one particular device, one particular standard or protocol, or one particular signaling direction and is expressly intended to not limit the scope of this application in any way. The use of these and other names is strictly for convenience and such names may be interchanged within this application without any loss of scope or rights.

Various techniques described herein can be used for various wireless communication systems, such as Code Division Multiple Access ("CDMA") systems, Multiple-Carrier CDMA ("MCCDMA"), Wideband CDMA ("W-CDMA"), High-Speed Packet Access ("HSPA," "HSPA+") systems, Time Division Multiple Access ("TDMA") systems, Frequency Division Multiple Access ("FDMA") systems, Single-Carrier FDMA ("SC-FDMA") systems, Orthogonal Frequency Division Multiple Access ("OFDMA") systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access ("UTRA"), cdma2000, or some other technology. UTRA includes W-CDMA and Low Chip Rate ("LCR"). The cdma2000 technology covers IS-2000, IS-95 and IS-856 standards. A TDMA network may implement a radio technology such as Global System for Mobile Communications ("GSM"). An OFDMA network may implement a radio technology such as Evolved UTRA ("E-UTRA"), IEEE 802.11 ("WiFi"), IEEE 802.16 "(WiMAX"), IEEE 802.20 ("MBWA"), Flash-OFDM®, etc. UTRA, E-UTRA, and GSM are part of Universal Mobile Telecommunication System ("UMTS"). The teachings herein may be implemented in a 3GPP Long Term Evolution ("LTE") system, an Ultra-Mobile Broadband ("UMB") system, and other types of systems. LTE is a release of UMTS that uses E-UTRA. Although certain aspects of the disclosure may be described using 3GPP terminology, it is to be understood that the teachings herein may be applied to 3GPP (Rel99, Rel5, Rel6, Rel7, etc.) technology, as well as 3GPP2 (1×RTT, 1×EV-DO RelO, RevA, RevB, etc.) technology and other technologies, such as WiFi, WiMAX, WMBA and the like.

Figure 1:
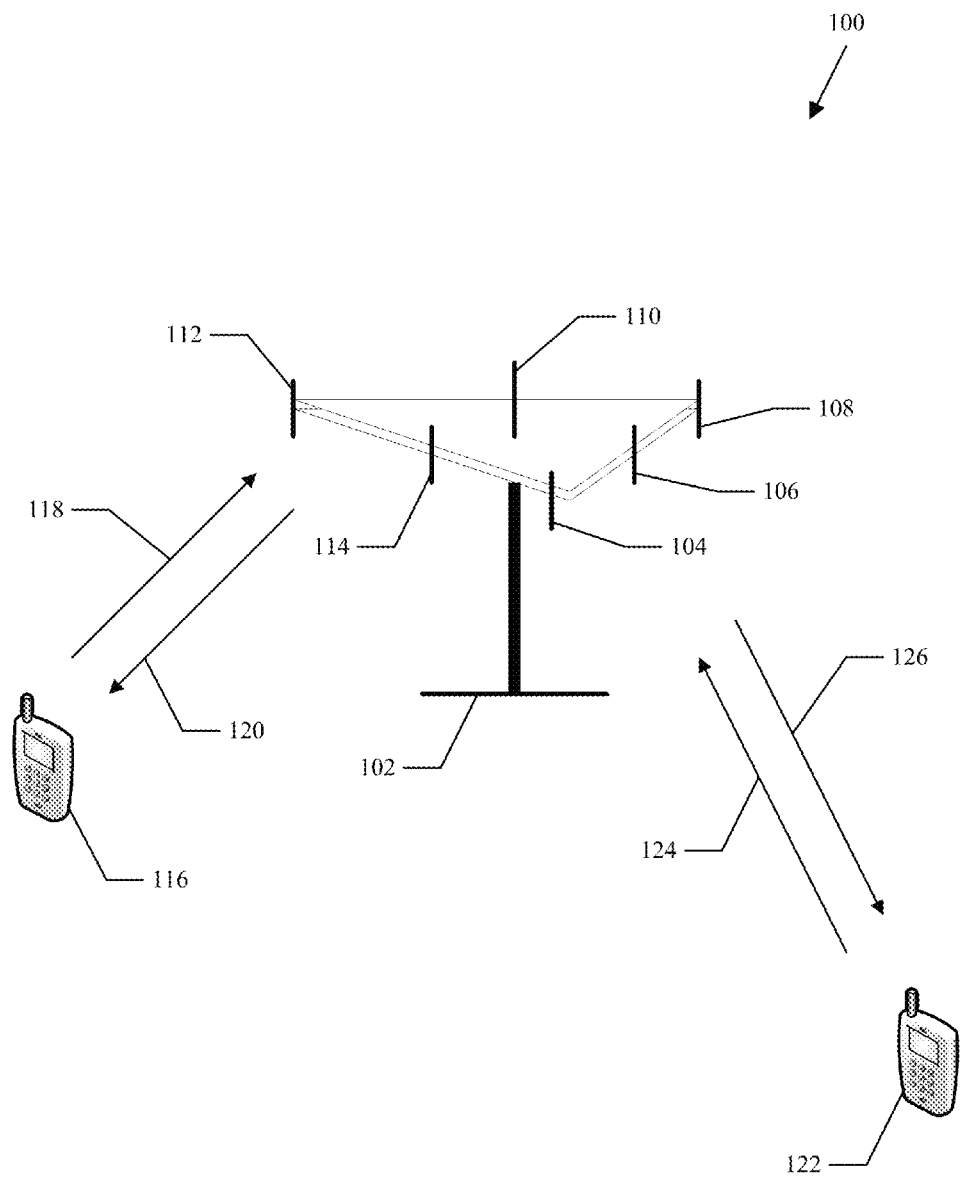
FIG. 1 illustrates an exemplary wireless multiple-access communication system according to certain embodiments.

Referring now to the drawings, FIG. 1 illustrates an exemplary wireless multiple-access communication system 100 according to certain embodiments. In one example, an evolved Node B (eNB) base station 102 includes multiple antenna groups. As shown in FIG. 1, one antenna group can include antennas 104 and 106, another can include antennas 108 and 110, and another can include antennas 112 and 114. While only two antennas are shown in FIG. 1 for each antenna group, it should be appreciated that more or fewer antennas may be utilized for each antenna group. As shown, user equipment (UE) 116 can be in communication with antennas 112 and 114, where antennas 112 and 114 transmit information to UE 116 over downlink (or forward link) 120 and receive information from UE 116 over uplink (or reverse link) 118. Additionally and/or alternatively, UE 122 can be in communication with antennas 104 and 106, where antennas 104 and 106 transmit information to UE 122 over downlink 126 and receive information from US 122 over uplink 124. In a frequency division duplex (FDD) system, communication links 118, 120, 124 and 126 can use different frequency for communication. In time division duplex (TDD) systems, the communication links can use the same frequency for communication, but at differing times.

Each group of antennas and/or the area in which they are designed to communicate can be referred to as a sector of the eNB or base station. In accordance with one aspect, antenna groups can be designed to communicate to mobile devices in a sector of areas covered by eNB 102. In communication over downlinks 120 and 126, the transmitting antennas of eNB 102 can utilize beamforming in order to improve the signal-to-noise ratio of downlinks for the different UEs 116 and 122. Also, a base station using beamforming to transmit to UEs scattered randomly through its coverage causes less interference to mobile devices in neighboring cells than a base station transmitting through a single antenna to all its UEs. In addition to beamforming, the antenna groups can use other multi-antenna or antenna diversity techniques, such as spatial multiplexing, spatial diversity, pattern diversity, polarization diversity, transmit/receive diversity, adaptive arrays, and the like.

Figure 2:
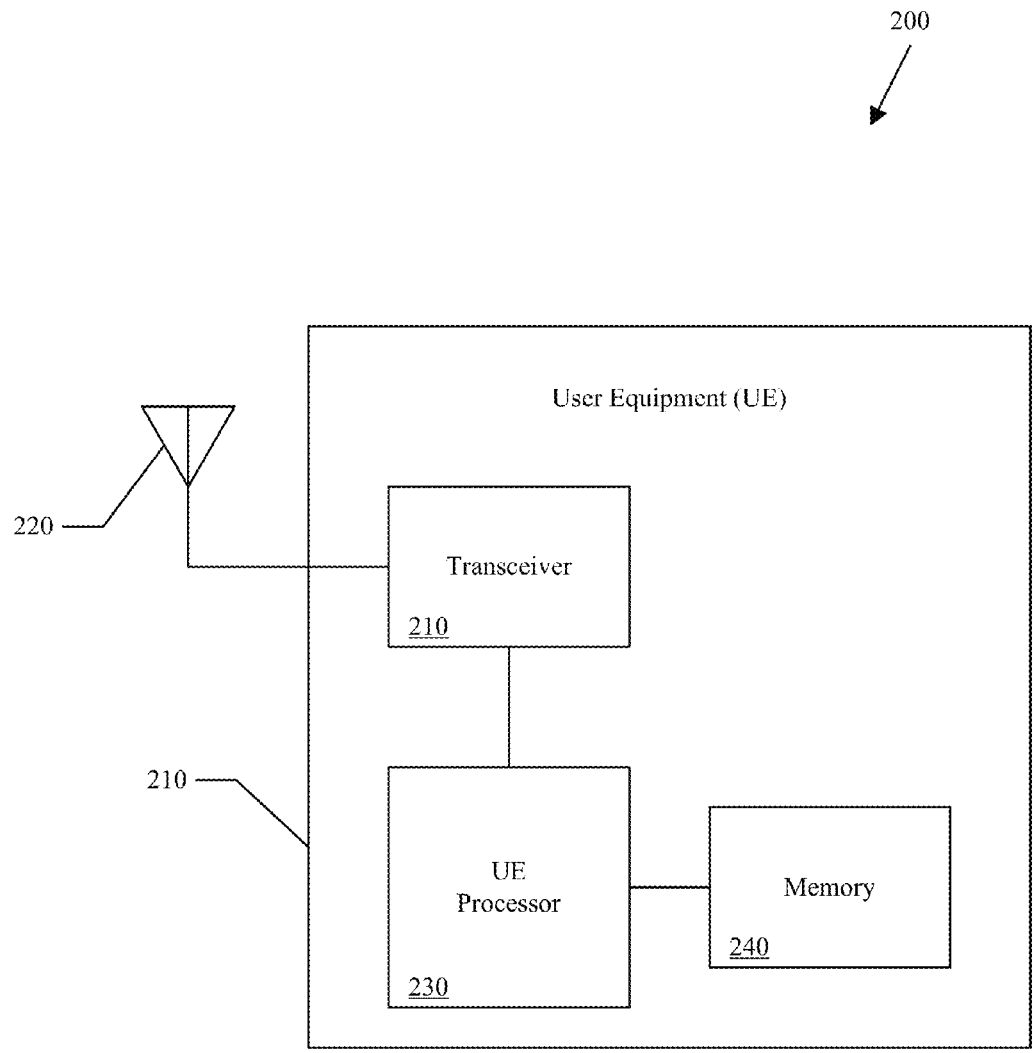
FIG. 2 illustrates a block diagram of an exemplary mobile device or user equipment (UE) according to certain embodiments.

FIG. 2 illustrates a block diagram 200 of an exemplary mobile device or user equipment (UE) 210 according to certain embodiments. As shown in FIG. 2, UE 210 may include a transceiver 210, an antenna 220, a processor 230, and a memory 240 (which, in certain embodiments, may include memory in a Subscriber Identity Module (SIM) card). In certain embodiments, some or all of the functionalities described herein as being performed by mobile communication devices may be provided by processor 230 executing instructions stored on a computer-readable medium, such as memory 240, as shown in FIG. 2. Additionally, UE 210 may perform uplink and/or downlink communication functions, as further disclosed herein, via transceiver 210 and antenna 220. While only one antenna is shown for UE 210, certain embodiments are equally applicable to multi-antenna mobile devices. In certain embodiments, UE 210 may include additional components beyond those shown in FIG. 2 that may be responsible for enabling or performing the functions of UE 210, such as communicating with multiple base stations in multiple networks and for processing information for transmitting or from reception, including any of the functionality described herein. Such additional components are not shown in FIG. 2 but are intended to be within the scope of coverage of this application.

Figure 3:
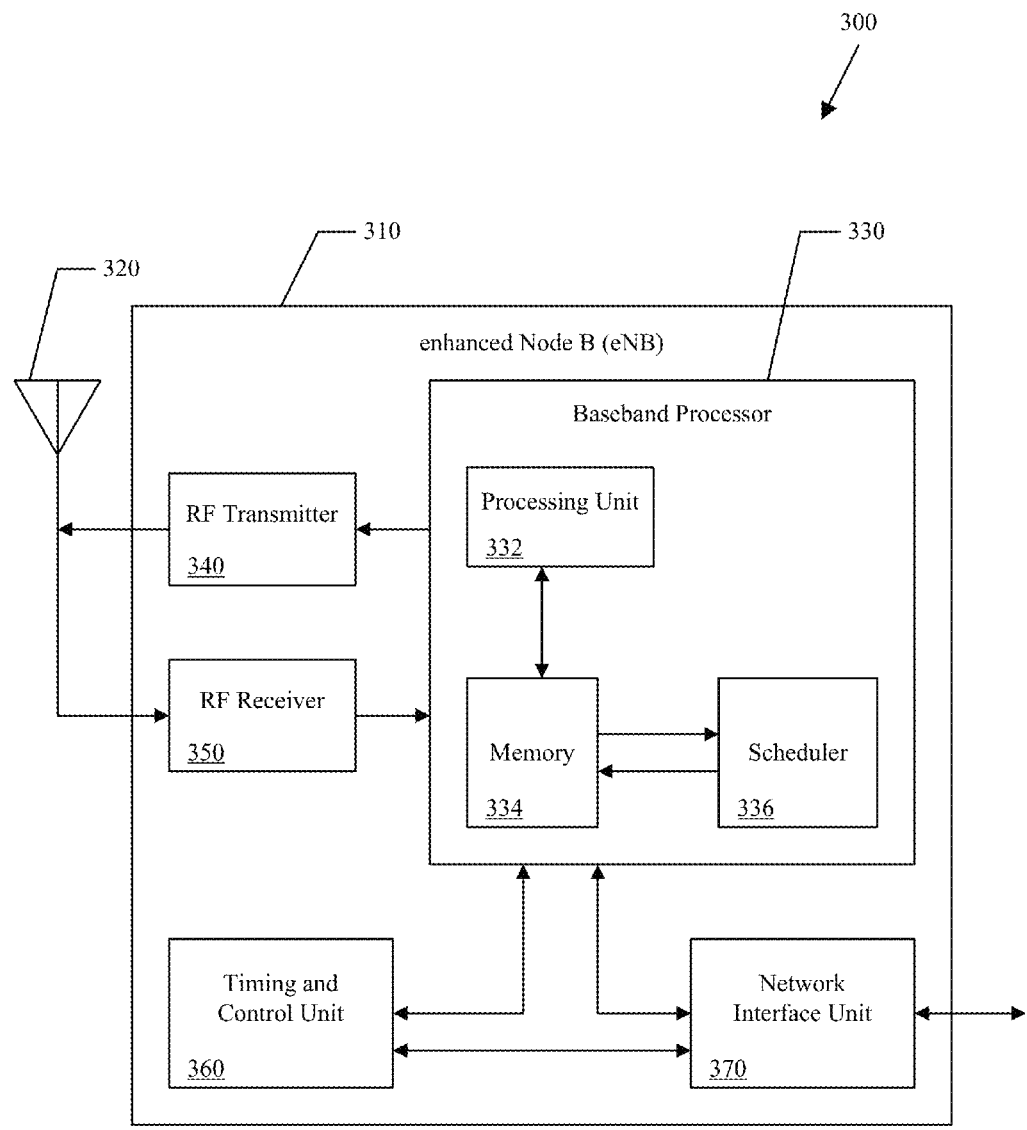
FIG. 3 illustrates a block diagram of an exemplary evolved Node B (eNB) or similar mobile communication node (e.g., base station, access point, etc.) according to certain embodiments.

FIG. 3 illustrates a block diagram 300 of an exemplary evolved Node B (eNB) 310 or similar mobile communication node (e.g., base station, access point, etc.) according to certain embodiments. As shown in FIG. 3, eNB 310 may include a baseband processor 310 to provide radio communication with mobile handsets via a radio frequency (RF) transmitter 340 and RF receiver 330 units coupled to the eNB antenna 320. While only one antenna is shown, certain embodiments are applicable to multi-antenna configurations. RF transmitter 340 and RF receiver 330 may be combined into one, transceiver unit or duplicated to facilitate multiple antenna connections and/or multiple transmit and/or receive chains. Baseband processor 320 may be configured (in hardware and/or software) to function according to a wireless communications standard, such as 3GPP LTE. Baseband processor 320 may include a processing unit 332 in communication with a memory 334 to process and store relevant information for the eNB and a scheduler 336, which may provide scheduling decisions for mobile devices serviced by eNB 310. Scheduler 336 may have some or all of the same data structure as a typical scheduler in an eNB in an LTE system.

Baseband processor 330 may also provide additional baseband signal processing (e.g., mobile device registration, channel signal information transmission, radio resource management, etc.) as required. Processing unit 332 may include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Some or all of the functionalities described herein as being provided by a mobile base station, a base station controller, a Node B, an evolved Node B, an access point, a home base station, a femtocell base station, and/or any other type of mobile communications node may be provided by processing unit 332 executing instructions stored on a computer-readable data storage medium, such as the memory 334 shown in FIG. 3.

In certain embodiments, eNB 310 may further include a timing and control unit 360 and a core network interface unit 370, such as are shown in FIG. 3. Timing and control unit 360 may monitor operations of baseband processor 330 and network interface unit 370, and may provide appropriate timing and control signals to these units. Network interface unit 370 may provide a bi-directional interface for eNB 310 to communicate with a core or back-end network (not shown) to facilitate administrative and call-management functions for mobile subscribers operating in the network through eNB 310.

Certain embodiments of the base station 310 may include additional components responsible for providing additional functionality, including any of the functionality identified herein and/or any functionality necessary to support the solution described herein. Although features and elements are described in particular combinations, each feature or element can be used alone without the other features and elements or in various combinations with or without one or more features and elements. Methodologies provided herein may be implemented in a computer program, software, or firmware incorporated in a computer-readable storage medium (e.g., memory 334 in FIG. 3) for execution by a general purpose computer or a processor (e. g., processing unit 332 in FIG. 3). Examples of computer-readable storage media include read only memory (ROM), random access memory (RAM), digital registers, cache memory, semiconductor memory devices, magnetic media such as internal hard disks, magnetic tapes and removable disks, magneto-optical media, and optical media such as CDROM disks, digital versatile disks (DVDs), and so on.

Figure 4:
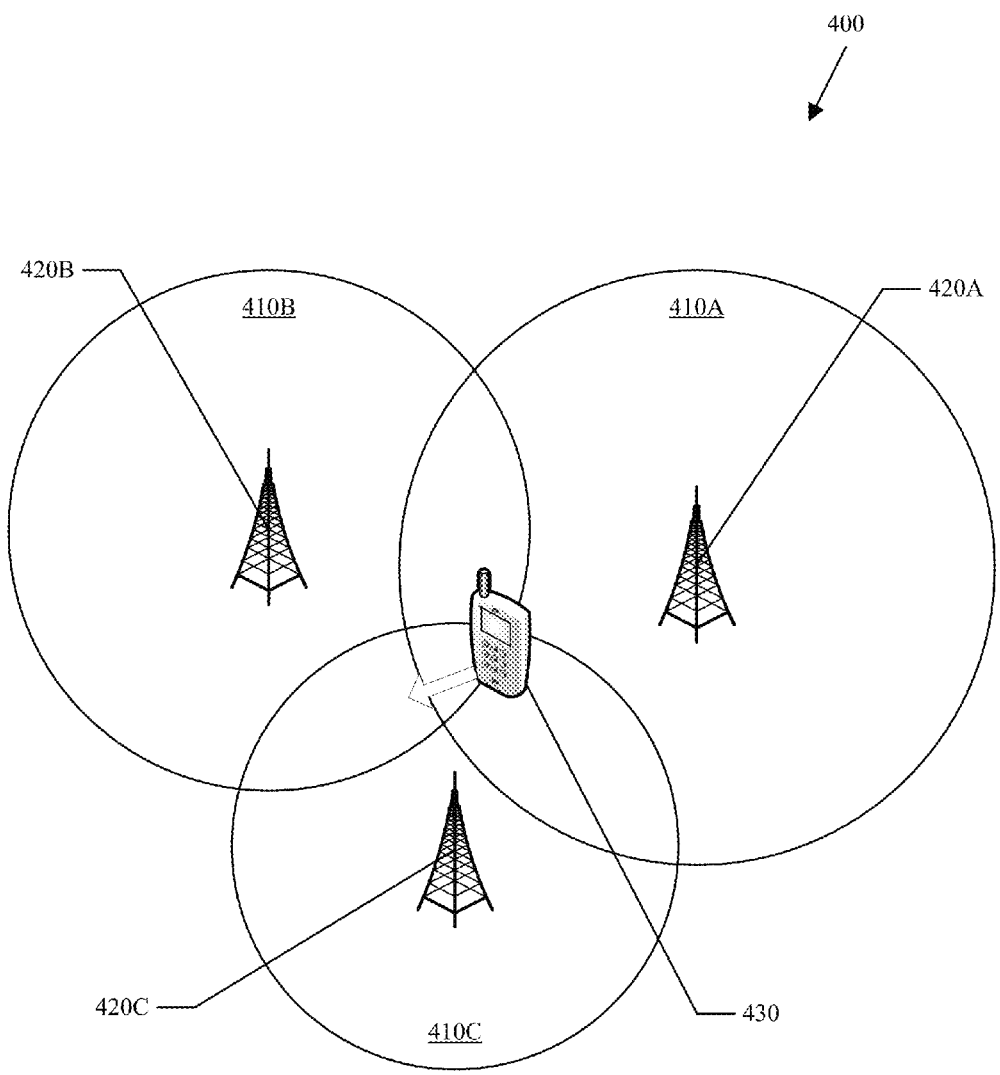
FIG. 4 illustrates a multi-cell, wireless communication system according to certain embodiments.

FIG. 4 illustrates a multi-cell, wireless communication system 400 according to certain embodiments. As shown in FIG. 4, system 400 can have a number of cellular regions (cells) 410A-C, each of which can include a cell tower 420A-C. Each cell tower 420 includes at least one base station (NodeB, eNodeB, etc.) capable of communicating via one or more antennas (not shown) with one or more wireless device 430. It is possible that a cell tower 420 may include multiple base stations. Each cell 410 can be configured under a different communication protocol (LTE, UTRA, cdma200, WiMAX, etc.) or two or more of cells 410 can be configured under the same communication protocol.

As shown in FIG. 4, device 430 can be associated with cell 410A, which might be an LTE cell, and can be actively communicating via cell tower 420A or can be in an idle mode within cell 410A. Device 430 may be a mobile device and be moving in a direction away from cell tower 420A (as shown). In this case, it may be that either cell 410B or 410C is better suited for communicating with device 430. To facilitate a switch between cells, device 430 may periodically measure the strength of surrounding cells 410B-C and/or periodically perform a cell reselection procedure.

In certain embodiments, this disclosure provides cell reselection and measurement in wireless communication. For example, in an LTE system, cell reselection and/or measurement procedures are provided for in the 3GPP technical specification (TS) 36.133 and TS-36.304 (both of which are fully incorporated herein by reference for all purposes). While this disclosure may provide examples in terms of specific standards, wireless protocols and devices, these specifics are not meant to limit the scope of this application in any way. After learning the teachings of this application, those skilled in the art will readily understand the applicability of this disclosure to any number of wireless technologies and devices.

In an LTE system, the cell reselection procedure allows the user equipment (UE, or mobile device) to select a more suitable cell and camp on it (i.e., become communicatively associated with it). When the UE is in certain states on a cell, the UE can attempt to detect, synchronize, and monitor intra-frequency, inter-frequency and inter-RAT (radio access technology) cells indicated by the serving cell (i.e., the cell on which the UE is currently camped). For intra-frequency and inter-frequency cells, the serving cell may or may not provide an explicit listing of neighboring cells, but instead may provide carrier frequency information and bandwidth information only. The UE measurement activity is also controlled by measurement rules, allowing the UE to limit its measurement activity.

Generally, as used herein for certain embodiments, an intra-frequency cell reselection process is where, for example, the UE remains on the same LTE channel and selects another cell on the same frequency. An inter-frequency cell reselection process is where, for example, the UE selects a different LTE channel. An inter-RAT (Radio Access Technology) cell reselection process is where, for example, the UE selects an entirely different radio network, such as from LTE to 1×EV-DO.

As previously mentioned, the UE can periodically search every layer (i.e., frequencies of neighboring cells or alternative frequencies within the serving cell) having a higher priority at least every $T_{higher\_priority\_search}=(60*N_{layers})$ seconds, where $N_{layers}$ is the total number of configured higher priority carrier frequencies (E-UTRA, UTRA FDD, UTRA TDD, CDMA2000 1×, HRPD, etc.) and $N_{layers}$ can be additionally increased by one if one or more groups of GSM frequencies is configured as a higher priority.

In certain embodiments, a UE can perform periodic non-intra-frequency search and/or measurement. The periodic measurements can check the signal strength and signal quality of searched inter-frequency cells and compare those to the serving cell signal strength and quality, respectively. Depending on the results of those inter-frequency comparisons, the UE can search, on a periodic basis (e.g., every $T_{reselect}$ seconds, which, as discussed below, may also be discussed in terms of discontinuous reception, DRX, cycles) only higher priority inter-frequency layers and/or equal or lower priority inter-frequency layers. Likewise, the periodic measurements can check the signal strength and signal quality of searched inter-RAT cells and compare those to the serving cell signal strength and quality, respectively. Depending on the results of those inter-RAT comparisons, the UE can search, on a periodic basis (e.g., every $T_{reselect}$ seconds, which, as discussed below, may also be in terms of discontinuous reception, DRX, cycles) only higher priority inter-RAT layers and/or equal or lower priority inter-RAT layers.

In certain embodiments, the above-mentioned periodic search and/or measurement performed by the UE as part of a cell reselection procedure may include the following criteria or threshold(s) for periodic measurement(s) of inter-RAT UTRAN FDD cells.

When the measurement rules indicate that UTRA FDD cells are to be measured, the UE can measure the common pilot channel (CPICH) energy per chip/noise spectral density (Ec/Io) and CPICH received signal code power (RSCP) of detected UTRA FDD cells in the neighbor frequency list at the minimum measurement rate (e.g., as can be specified, for example, in an LTE standard). The parameter $N_{UTRA\_carrier}$ is the number of carriers in the neighbor frequency list. The UE can filter CPICH Ec/Io and CPICH RSCP measurements of each measured UTRA FDD cell using at least 2 measurements. Within the set of measurements used for the filtering, at least two measurements can be spaced by at least half the minimum specified measurement period.

The UE can evaluate whether newly detectable UTRA (UMTS Terrestrial Radio Access; where UMTS refers to Universal Mobile Telecommunications System) FDD (frequency division duplexing) cells have met the reselection criteria (e.g., as can be specified, for example, in an LTE standard) within time $(N_{UTRA\_carrier})*T_{detectUTRA\_FDD}$ when Srxlev≤$S_{nonIntraSearchP}$ or Squal≤$S_{nonIntraSearchQ}$ when Treselection$_{RAT}$=0 provided that the reselection criteria is met by a margin of at least 6 dB, for example, for reselections based on RSCP, or a margin of at least 3 dB, for example, for reselections based on Ec/Io. Cells which have been detected can be measured at least every $(N_{UTRA\_carrier})*T_{measureUTRA\_FDD}$ when $Srxlev \leq S_{nonIntraSearchP}$ or $Squal \leq S_{nonIntraSearchQ}$. The term $T_{detectUTRA\_FDD}$ is described in 3GPP TS 36.133 Section 4.2.2.5.1 and Table 4.2.2.5.1-1 and refers to a period of time of either 30 s or 60 s. The term "Srxlev" refers to the cell selection RX level, defined in TS 36.04, subclause 5.2.3.2. The term $S_{nonIntraSearchP}$ is defined in 3GPP TS 36.304, subclause 5.2.4.7 and specifies the Srxlev threshold (in dB) for E-UTRAN inter-frequency and inter-RAT measurements. The term Squal refers to the cell selection quality, defined in TS 36.304, subclause 5.2.3.2. The term $S_{nonIntraSearchQ}$ is defined in 3GPP TS 36.304, subclause 5.2.4.7, and specifies the Squal threshold (in dB) for E-UTRAN inter-frequency and inter-RAT measurements.

In certain embodiments, Table 1 provides some examples for $T_{detectUTRA\_FDD}$ and $T_{measureUTRA\_FDD}$ as compared to discontinuous reception (DRX) cycle lengths for periodic measurement(s) of inter-RAT UTRAN FDD cells as discussed above.

TABLE 1

| DRX Cycle Length [s] | $T_{detectUTRA}$_FDD [s] | $T_{measureUTRA}$_FDD [s] (number of DRX cycles) |
|---|---|---|
| 0.32 | 30 | 5.12 (16) |
| 0.64 |  | 5.12 (8) |
| 1.28 |  | 6.4 (5) |
| 2.56 | 60 | 7.68 (3) |

In certain embodiments, the above-mentioned periodic search and/or measurement performed by the UE as part of a cell reselection procedure may include the following criteria or threshold(s) for periodic measurement(s) of inter-RAT UTRAN GSM cells.

When measurement rules (e.g., as can be specified, for example, in an LTE standard) indicate that E-UTRAN inter-frequencies or inter-RAT frequency cells are to be measured, the UE can measure the signal level of the GSM broadcast control channel (BCCH) carriers if the GSM BCCH carriers are indicated in the measurement control system information of the serving cell. GSM BCCH carriers of lower priority than the serving cell can be measured at least every $T_{measure,GSM}$.

In certain embodiments, Table 2 provides some examples for $T_{measure,GSM}$ as compared to discontinuous reception (DRX) cycle lengths for periodic measurement(s) of inter-RAT UTRAN GSM cells as discussed above.

TABLE 2

| DRX Cycle Length [s] | $T_{measure,GSM}$ [s] (number of DRX cycles) |
|---|---|
| 0.32 | 5.12 (16) |
| 0.64 | 5.12 (8) |
| 1.28 | 6.4 (5) |
| 2.56 | 7.68 (3) |

Figure 5:
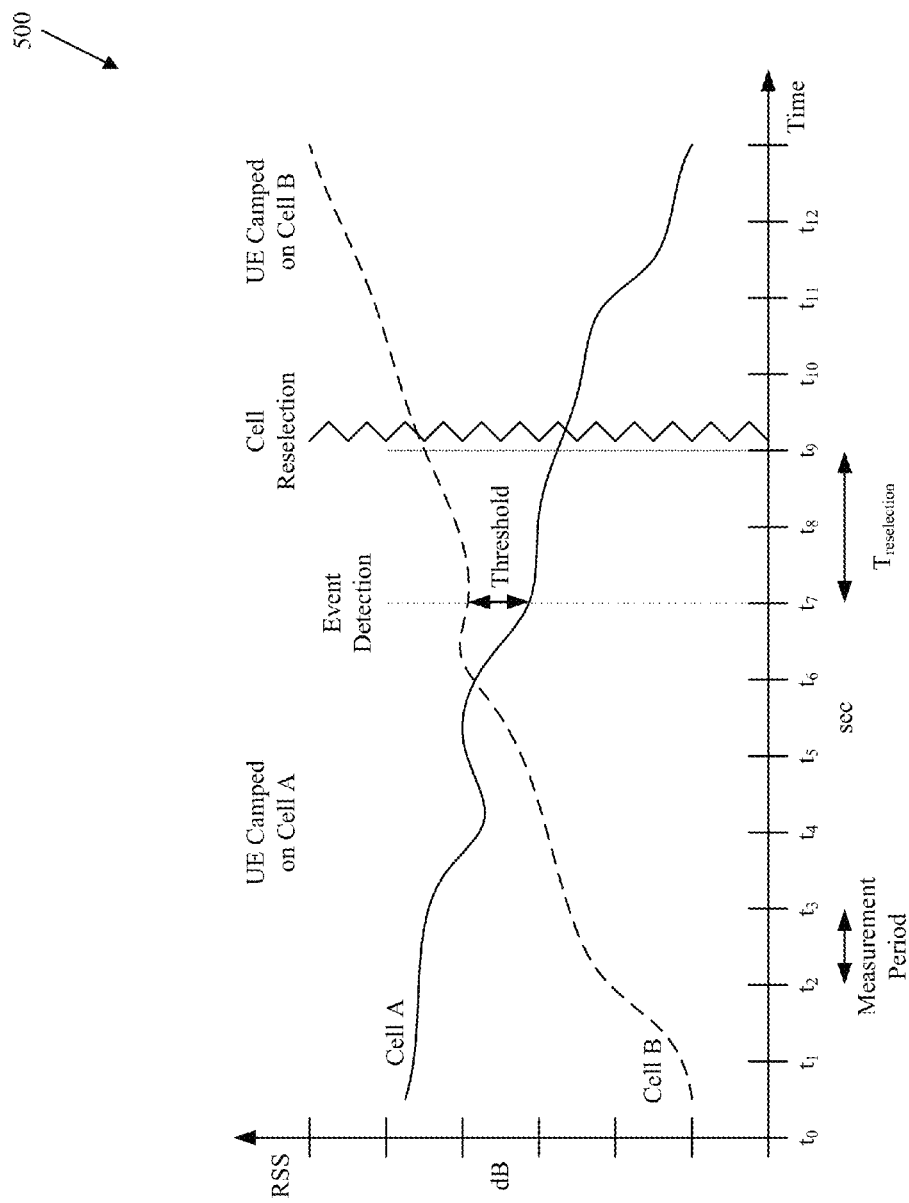
FIG. 5 illustrates an exemplary UE cell reselection procedure 900 according to certain embodiments.

FIG. 5 illustrates an exemplary UE cell reselection procedure 500 according to certain embodiments. As shown in FIG. 5, a UE can start as being camped on Cell A and performs reselection measurements every measurement period, t. The reselection measurements can include one or more types of received signal strength (RSS) measurements, and can be, for example in decibels (dB). The received signals can be, for example, pilot symbols or similar reference signals. At each measurement period, t, the UE can check to see whether the RSS measurement for a different cell surpasses the RSS measurement for the cell on which it is camped. This check can include some threshold amount beyond which the RSS measurement of the different cell must surpass the current cell RSS measurement; this threshold amount can be known as a hysteresis amount.

As shown in FIG. 5, at measurement period $t_7$, Cell B RSS has surpassed Cell A RSS by the threshold. The UE may perform cell reselection at this point. However, to ensure that the measurement is not an anomalous or fleeting measurement, the UE may not perform cell reselection until after the Cell B RSS measurement has stayed above the Cell A RSS measurement (plus the threshold amount, perhaps) for a period of time, $T_{reselection}$. For example, in some embodiments, the UE may only perform reselection on an evaluation which occurs simultaneously to, or later than the expiry of a $T_{reselection}$ timer. In FIG. 5, $T_{reselection}$ is shown as two measurement periods, after which the UE can perform cell reselection, resulting in the UE being camped on Cell B.

In certain embodiments, consider the following example, where a UE has a DRX cycle of 1.28 seconds. Further, assume that one or more base stations (eNodeB or eNB) have configured N UTRA frequencies and M GSM frequencies, generally, N+M non-intra-frequencies (NIFs). In this case, the maximum UE measurement periodicity for the UTRA frequencies will be (N*5) DRX cycles and for the GSM frequencies it will be 5 DRX cycles. Additionally, assume the UTRA RAT is the higher priority RAT as compared to the GSM RAT and $T_{reselection}$ (or $T_{resel}$) for both RATs is set to 2 seconds (i.e., this implies at least 2 measurements are needed after neighbor UTRA/GSM cells can become the serving cell). Finally, assume that the UE is in a location where both a UTRA cell and a GSM cell are available.

In certain embodiments, with reference to the above scenario and as shown in FIG. 4, the serving cell (Cell 1) can be cell 410A, the GSM cell (Cell 2) can be cell 410C and the UTRA cell (Cell 3) can be cell 410B. The UE can be device 430. Thus, the UE is camped on Cell 1, and Cells 2 and 3 are available, with Cell 3 having the higher priority.

As previously mentioned, the LTE standard, under certain conditions, requires that the UE perform non-intra-frequency (NIF) measurements at least every $T_{higher\_priority\_search} = (60*N_{layers})$ seconds (not counting the additional one for GSM). Under the current assumptions, that time would be at least every $(60*(N+M))$ seconds. However, the UE is capable of taking measurements much faster than that, say every one (1) second or every one (1) DRX cycle. In the case where the UE is taking NIF measurements every one (1) DRX cycle, the UE will experience very high power drain as compared to the maximum measurement periodicity.

Alternatively, in certain embodiments, if the UE is set to take NIF measurements every 5 DRX cycles for Cell 2 (the GSM cell) and (N*5) DRX cycles for Cell 3 (the UTRA cell) and if both Cell 2 and Cell 3 are detected together, then this will lead to Cell 3 (the higher priority cell) having a lower switch-to rate than Cell 2 (i.e., again, given the assumptions above, such that the GSM cell, Cell 2, will get its second measurement before the UTRA cell, Cell 3). Likewise if the GSM cell, Cell 2, is detected prior to the UTRA cell, Cell 3, then this can also lead to Cell 2 having a higher switch-to rate than Cell 3. Finally, even if the UTRA cell, Cell 3, is detected before Cell 2 (the GSM cell), then for some cases of the value N, the GSM cell will still have a higher switch-to rate than Cell 3 (i.e., the GSM cell can get two measurements performed at one per 5 DRX cycles before the UTRA cell can at one measurement per (N*5) DRX cycle).

In certain embodiments, each of the above-described situations results in the higher priority reselection candidate cell (the UTRA cell, Cell 3) having a lower switch-to rate than the non-higher priority reselection candidate cell (the GSM cell, Cell 2). There are additional situations, to many to specifically list here, resulting in this anomaly. One solution might be for the UE to perform measurements every one (1) DRX cycle, but since each measurement uses UE power, this solution may unnecessarily use more power than is desired.

Figure 6:
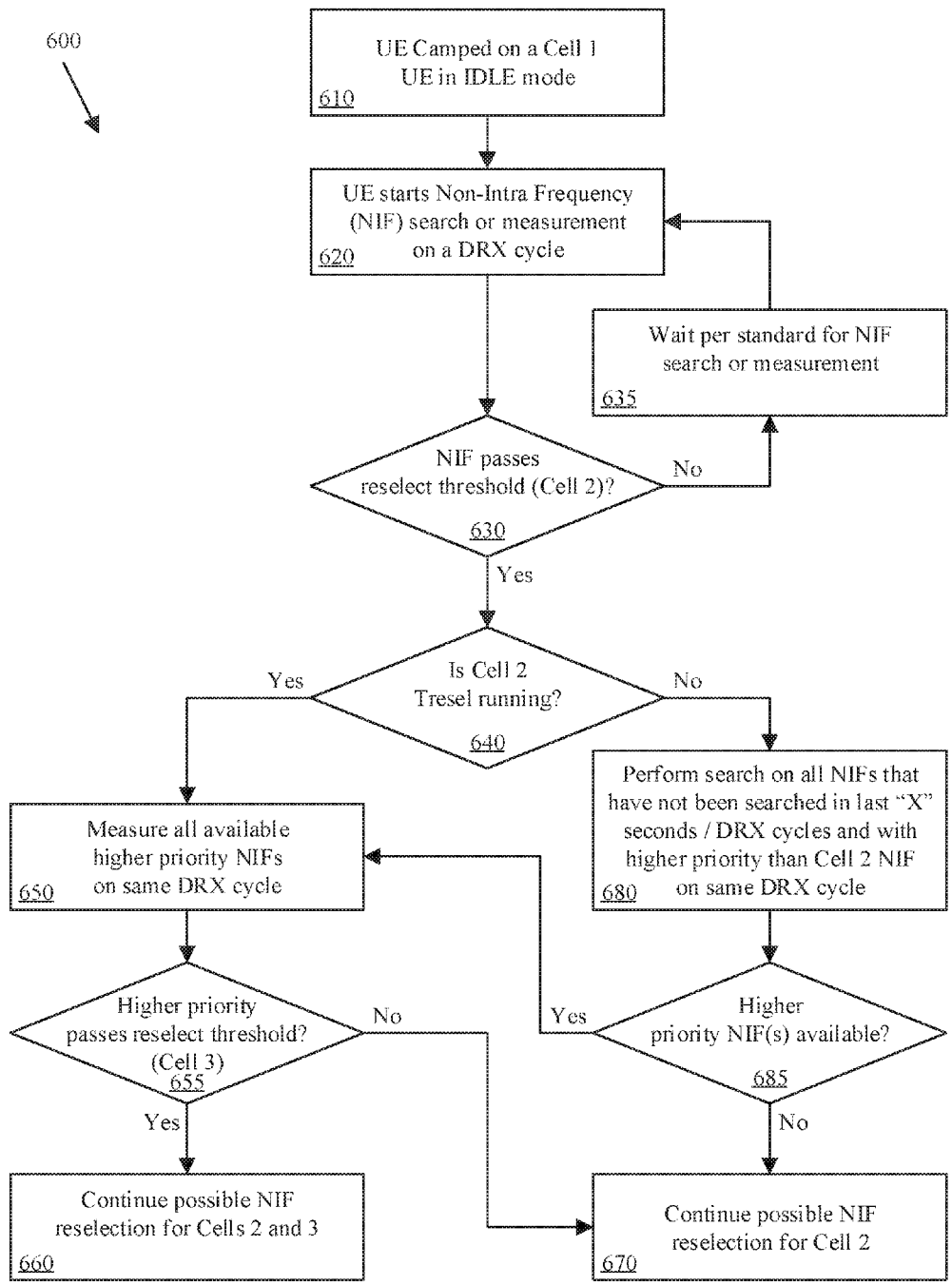
FIG. 6 illustrates an exemplary flow for performing UE cell reselection according to certain embodiments.

FIG. 6 illustrates an exemplary flow 600 for performing UE cell reselection according to certain embodiments. As shown in FIG. 6, at step 610, a UE is camped on Cell 1, which may be an LTE cell, and is in an idle mode. At step 620, the UE starts non-intra-frequency (NIF) search and/or measurement on a DRX cycle. At step 630, if no NIF passes reselection threshold, then at step 635, the UE can wait per the standard for the next NIF search and/or measurement DRX cycle, after which the UE can continue at step 620. However, if a NIF does pass the reselection threshold, e.g., Cell 2, then at step 640 a check can be made to determine whether the Cell 2 $T_{resel}$ is running. If $T_{resel}$ is running, then at step 650, the UE can measure all available higher priority NIFs on the same DRX cycle (i.e., the same cycle as with step 620). At step 655, if no higher priority NIFs pass reselection threshold, then at step 670 the UE can continue with the possible cell reselection for Cell 2. However, if at step 655, a higher priority NIF, e.g., Cell 3, does pass a reselection threshold, then the UE can continue with the possible cell reselection for both Cell 2 and Cell 3 (see discussion on FIG. 8, for at least one possibility for handling a part of this possible cell reselection).

Returning to step 640 of FIG. 6, if Cell 2 $T_{resel}$ is not running, then at step 680 the UE can perform a search on the same DRX cycle (i.e., the same cycle as with step 620) on all NIFs that have not been searched in the last X seconds/DRX cycles and that have a higher priority than the Cell 2 NIF. Note that, in certain embodiments, X can be zero (0). At step 685, if no higher priority NIFs are available, then at step 670 the UE can continue with the possible cell reselection for Cell 2. However, if at step 685 there are higher priority NIFs available, then at step 650, the UE can measure all available higher priority NIFs on the same DRX cycle (i.e., the same cycle as with step 620). The UE can then continue from step 650 as discussed above. By performing the steps illustrated in FIG. 6, the UE may not trigger reselection until all disclosed measurements/checks are completed in the same DRX cycle. This will help pick a high priority, available cell for reselection without the power-drain burden of having to perform measurements/checks on every DRX cycle.

Figure 7:
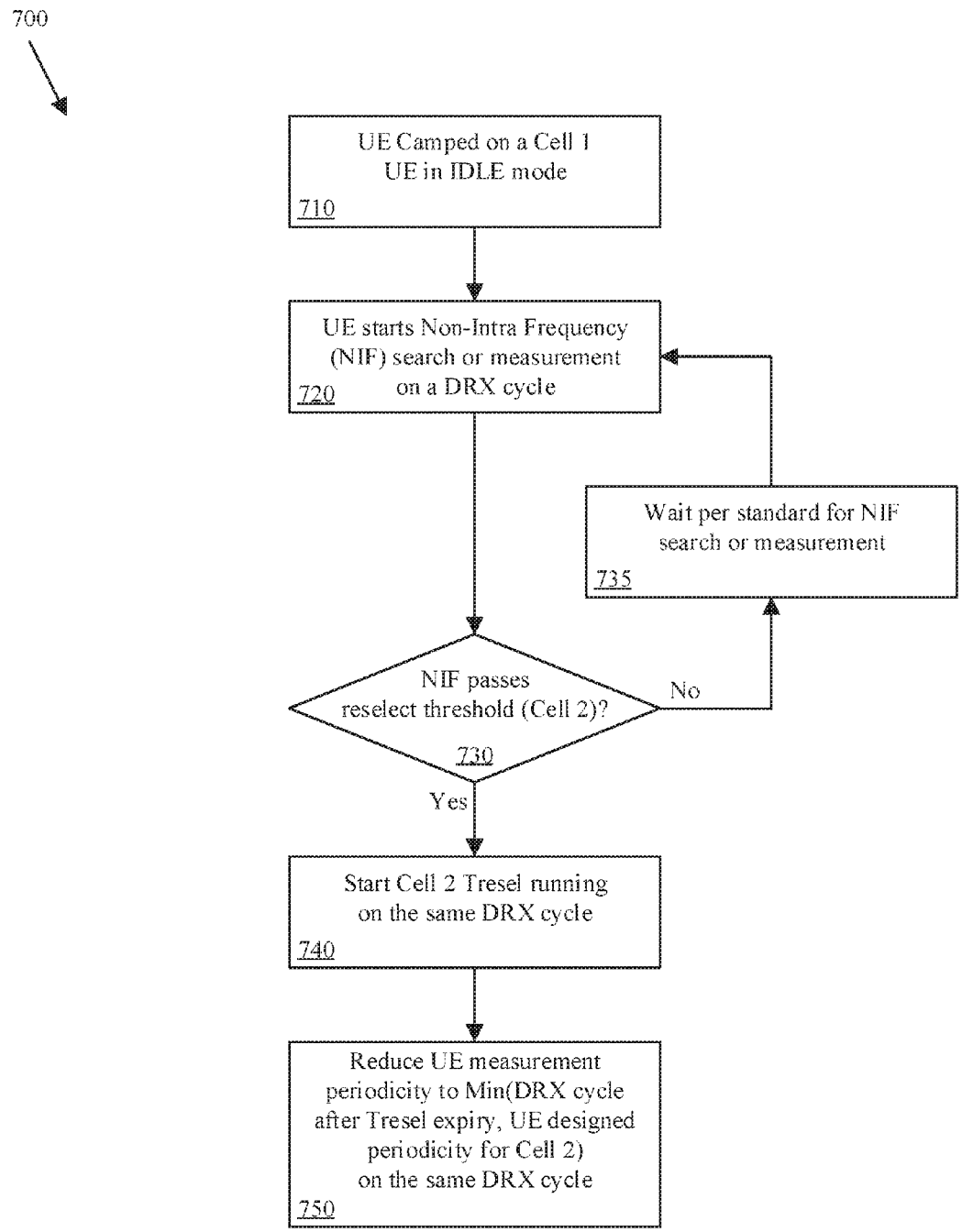
FIG. 7 illustrates an exemplary flow for performing UE cell reselection according to certain embodiments.

FIG. 7 illustrates an exemplary flow 700 for performing UE cell reselection according to certain embodiments. As shown in FIG. 7, at step 710, a UE is camped on Cell 1, which may be an LTE cell, and is in an idle mode. At step 720, the UE starts non-intra-frequency (NIF) search and/or measurement on a DRX cycle. At step 730, if no NIF passes reselection threshold, then at step 735, the UE can wait per the standard for the next NIF search and/or measurement DRX cycle, after which the UE can continue at step 720. However, if a NIF does pass the reselection threshold, e.g., Cell 2, then at step 740 the UE can start the Cell 2 $T_{resel}$ running on the same DRX cycle (i.e., the same cycle as with step 720). Once the Cell 2 $T_{resel}$ is started, then at step 750 the UE can, on the same DRX cycle, reduce its cell reselection measurement periodicity to the minimum of 1) the DRX cycle after the Cell 2 $T_{resel}$ expires, or 2) the general, designed-in UE periodicity for Cell 2. By adjusting the UE measurement periodicity in this manner, a higher priority and available cell (i.e., Cell 3) can have the opportunity to be measured before the UE performs cell reselection to Cell2.

Figure 8:
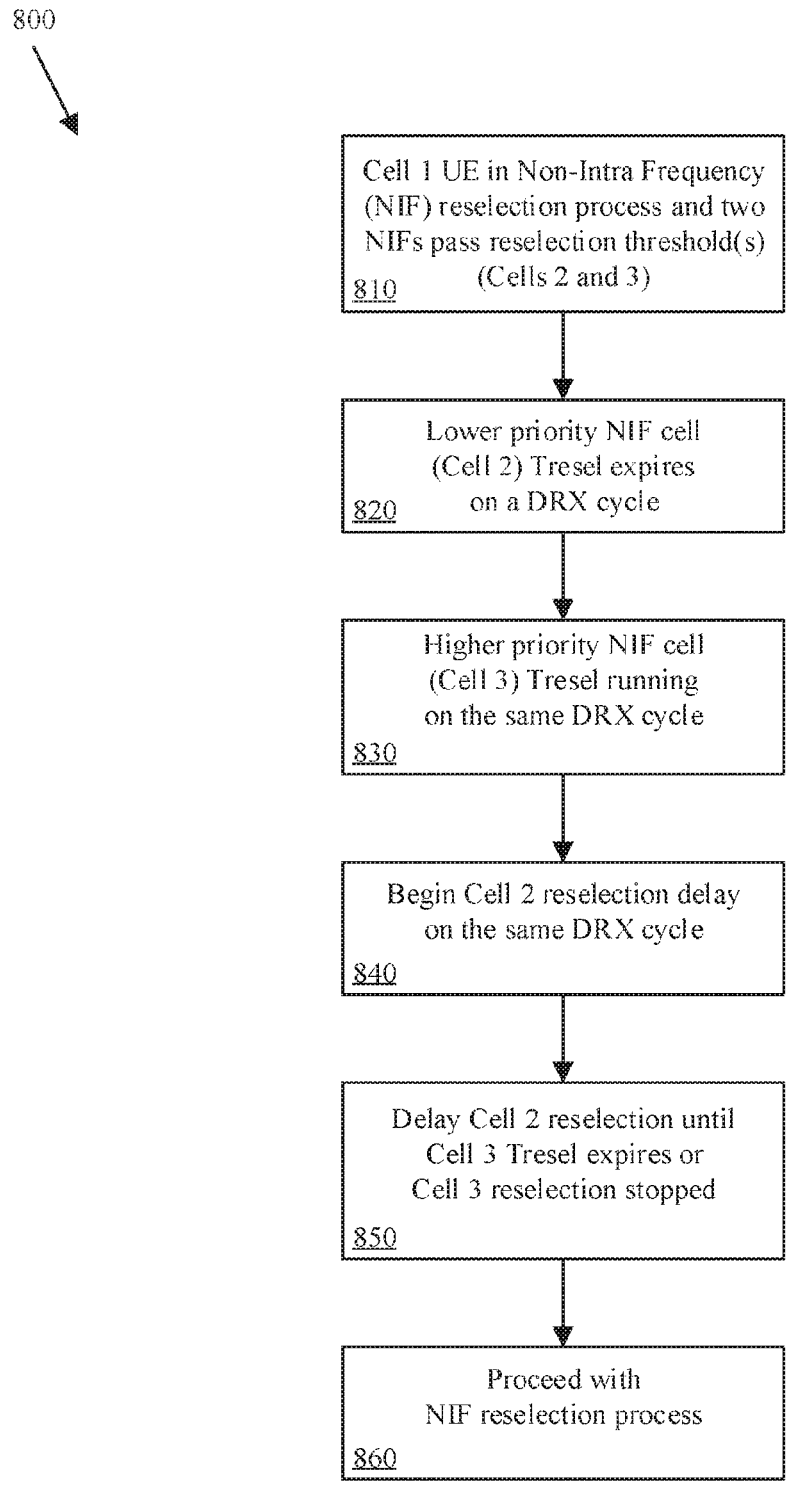
FIG. 8 illustrates an exemplary flow for performing UE cell reselection according to certain embodiments.

FIG. 8 illustrates an exemplary flow 800 for performing UE cell reselection according to certain embodiments. As shown in FIG. 8, at step 810, a Cell 1 UE is in a non-intra-frequency (NIF) reselection process and is at a point where two NIFs, Cell 2 and Cell 3, have passed reselection threshold(s). At step 820, the $T_{resel}$ expires for the lower priority NIF, Cell 2, on a discontinuous reception (DRX) cycle. However, at step 830 and on the same DRX cycle, the $T_{resel}$ for the higher priority NIF, Cell 3, is still running Under these circumstances, at step 840 and still on the same DRX cycle, the UE can begin a delay of the Cell 2 reselection. At step 850, the UE can continue the delay of the Cell 2 reselection until after some criteria, such as after the $T_{resel}$ for Cell 3 expires or after the Cell 3 reselection stopped (e.g., when the reselection measurements for Cell 3 no longer pass the reselection threshold). After the Cell 2 reselection is delayed, then at step 860, the UE can continue with the NIF reselection process. By delaying the UE Cell 2 reselection in this manner, the $T_{resel}$ for a higher priority cell (i.e., Cell 3) can have opportunity to run successfully, allowing the UE to perform cell reselection to Cell 3, the higher priority NIF.

While FIG. 6 through FIG. 8 have been presented separately, those skilled in the art will learn from this disclosure that any two or more of the process depicted in these figures, and variations thereof, may be combined into one, more comprehensive, process. As can now be seen, the combined process will perform many checks/measurements on one DRX cycle. The scope of this application is intended to cover these combinations. Also, in the discussion of these figures, the singular use of the terms "threshold" and "$T_{resel}$" is not meant to restrict each use instance to the same one "threshold" and "$T_{resel}$" but instead, multiple "thresholds" and "$T_{resels}$" can be used, one or more of each for each NIF and/or cell.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of ordinary skill would further appreciate that the various illustrative logical blocks, modules, and algorithm steps described in connection with the examples disclosed herein may be implemented as electronic hardware, firmware, computer software, middleware, microcode, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints or preferences imposed on the overall system. Skilled artisans may implement the described functionality in varying ways for each particular application, but such implementation decisions should not be interpreted as causing a departure from the scope of the disclosed methods.

The various illustrative logical blocks, components, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in one or more software modules executed by one or more processing elements, or in a combination of the two. A software module may reside in RAM memory, flash memory, ROM memory, EPROM memory, EEPROM memory, registers, hard disk, a removable disk, a CD-ROM, or any other form or combination of storage medium known in the art. An example storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples and additional elements may be added.

What is claimed is:

1. A method for non-intra-frequency (NIF) cell reselection in a wireless communication system comprising:
    detecting, on a first discontinuous reception (DRX) cycle, whether a measurement of a NIF for a second cell has passed a measurement of a current serving cell by a second reselection threshold;
    performing, on the first DRX cycle, additional checks or measurements to determine whether a measurement of a higher priority NIF for a third cell has passed a measurement of the current serving cell by a third reselection threshold, wherein said performing the additional checks or measurements on the first DRX cycle occurs in response to the measurement of the NIF for the second cell passing the measurement of the current serving cell by the second reselection threshold; and
    continuing a cell reselection process to select one of the second cell or the third cell based on results of the cell reselection process, wherein said continuing the cell reselection process is performed in response to determining that the measurement of the higher priority NIF for the third cell has passed the measurement of the current serving cell by the third reselection threshold, and wherein said continuing the cell reselection process includes:
        detecting, on a second DRX cycle, that a first timer for the second cell expires;
        detecting, on the second DRX cycle, that a second timer for the third cell is still running;
        beginning reselection delay for the second cell on the second DRX cycle; and
    delaying the second cell reselection until after the second timer expires or until after possible NIF reselection for the third cell has stopped.

2. The method of claim 1, wherein the second and third reselection thresholds are the same.

3. The method of claim 1, wherein the step of performing includes checking whether a first timer is running for the second cell.

4. The method of claim 3, wherein the step of performing further includes, if the first timer is running:
    measuring, on the first DRX cycle, available higher priority NIFs;
    if no higher priority NIF measurement passes a reselection threshold, continuing possible NIF reselection for the second cell; and
    if the higher priority NIF of the third cell passes the third reselection threshold, continuing possible NIF reselection for the second cell and the third cell.

5. The method of claim 3, wherein the step of performing further includes, if the first timer is not running:
    searching, on the first DRX cycle, NIFs that have not been searched within a number of DRX cycles and that have a higher priority than NIFs of the second cell;
    if no available higher priority NIF is available, continuing possible NIF reselection for the second cell;
    if the higher priority NIF of the third cell is available, measuring, on the first DRX cycle, the available higher priority NIF;
        if the measurement of the higher priority NIF of the third cell does not pass the reselection threshold, continuing possible NIF reselection for the second cell; and
        if the measurement of the higher priority NIF of the third cell passes the reselection threshold, continuing possible NIF reselection for the second cell and the third cell to select one of the second cell or the third cell.

6. The method of claim 1, wherein the second DRX cycle is the same as the first DRX cycle, the first timer is zero and the second timer is greater than zero.

7. The method of claim 1, wherein the step of performing further includes:
    starting, on the first DRX cycle, a first timer running for the second cell; and
    reducing, on the first DRX cycle, a user equipment (UE) measurement periodicity to the lesser of a DRX cycle immediately after the first timer expires and a UE designed periodicity for the second cell.

8. An apparatus for non-intra-frequency (NIF) cell reselection in a wireless communication system comprising:
    a processor for detecting, on a first discontinuous reception (DRX) cycle, whether a measurement for a NIF for a second cell has passed a measurement of a current serving cell by a second reselection threshold;
    a processor for starting, on the first DRX cycle, a first timer running for the second cell; and
    a processor for reducing, on the first DRX cycle, a user equipment (UE) measurement periodicity to the lesser of a DRX cycle immediately after the first timer expires and a UE designed periodicity for the second cell;
a processor for performing, on the first DRX cycle, additional checks or measurements to determine whether a measurement of a higher priority NIF for a third cell has passed a measurement of the current serving cell by a third reselection threshold, wherein the additional checks and measurements are performed in response to the processor detecting on the first DRX cycle that the measurement for the NIF on the second cell has passed the measurement of the current serving cell by the second reselection threshold; and
a processor for selecting the third cell based at least in part in response to determining that the measurement of the higher priority NIF for the third cell has passed the measurement of the current serving cell by the third reselection threshold, wherein the processor for continuing a cell reselection process for the second cell and the third cell includes:
a processor for detecting, on a second discontinuous reception (DRX) cycle, that a first timer for the second cell expires;
a processor for detecting, on the second DRX cycle, that a second timer for the third cell is still running;
a processor for beginning reselection delay for the second cell on the second DRX cycle; and
a processor for delaying the second cell reselection until after the second timer expires or until after possible NIF reselection for the third cell has stopped.

9. The apparatus of claim 8, wherein the second and third reselection thresholds are the same.

10. The apparatus of claim 8, wherein the processor for performing the additional checks or measurements further includes:
a processor for measuring, on the first DRX cycle, available higher priority NIFs;
if no higher priority NIF measurement passes a reselection threshold, a processor for continuing possible NIF reselection for the second cell; and
if the higher priority NIF of the third cell passes a reselection threshold, a processor for continuing possible NIF reselection for the second cell and the third cell.

11. The apparatus of claim 8, wherein the second DRX cycle is the same as the first DRX cycle, the first timer is zero and the second timer is greater than zero.

12. A computer-program storage apparatus for non-intrafrequency (NIF) cell reselection in a wireless communication system comprising a memory having one or more software modules stored thereon, the one or more software modules being executable by one or more processors and the one or more software modules comprising:
code for detecting, on a first discontinuous reception (DRX) cycle, whether a measurement of a NIF for a second cell has passed a measurement of a current serving cell by a second reselection threshold;
code for performing, on the first DRX cycle, additional checks or measurements to determine whether a measurement of a higher priority NIF for a third cell has passed a measurement of the current serving cell by a third reselection threshold, wherein the code for performing executes on the first DRX cycle in response to the measurement of the NIF for the second cell passing the measurement of the current serving cell by the second reselection threshold; and
code for detecting, on a second discontinues reception (DRX) cycle, that a first timer for the second cell expires;
code for detecting, on the second DRX cycle, that a second timer for the third cell is still running;
code for beginning reselection delay for the second cell on the second DRX cycle; and
code for delaying the second cell reselection until after the second timer expires or until after possible NIF reselection for the third cell has stopped
code for selecting one of the second cell or the third cell based on results of the NIF cell reselection.

13. The computer-program storage apparatus of claim 12, wherein the code for performing includes code for checking whether a first timer is running for the second cell.

14. The computer-program storage apparatus of claim 13, wherein the code for performing further includes, if the first timer is running:
code for measuring, on the first DRX cycle, available higher priority NIFs;
if no higher priority NIF measurement passes a reselection threshold, code for continuing possible NIF reselection for the second cell; and
if the higher priority NIF of the third cell passes a reselection threshold, code for continuing possible NIF reselection for the second cell and the third cell.

15. The computer-program storage apparatus of claim 13, wherein the code for performing further includes, if the first timer is not running:
code for searching, on the first DRX cycle, NIFs that have not been searched within a number of DRX cycles and that have a higher priority than NIFs of the second cell;
if no available higher priority NIF is available, code for continuing possible NIF reselection for the second cell;
if the higher priority NIF of the third cell is available, code for measuring, on the first DRX cycle, the available higher priority NIF;
if the measurement of the higher priority NIF of the third cell does not pass the reselection threshold, code for continuing possible NIF reselection for the second cell; and
if the measurement of the higher priority NIF of the third cell passes the reselection threshold, code for continuing possible NIF reselection for the second cell and the third cell.

16. The computer-program storage apparatus of claim 12, wherein the second DRX cycle is the same as the first DRX cycle, the first timer is zero and the second timer is greater than zero.

17. The computer-program storage apparatus of claim 12, wherein the code for performing further includes:
code for starting, on the first DRX cycle, the first timer running for the second cell; and code for reducing, on the first DRX cycle, a user equipment (UE) measurement periodicity to the lesser of a DRX cycle immediately after the first timer expires and a UE designed periodicity for the second cell.

* * * * *